United States Patent
Yoshida et al.

(10) Patent No.: US 9,513,852 B2
(45) Date of Patent: Dec. 6, 2016

(54) PRINT INSTRUCTION DEVICE, PRINTING SYSTEM, NON-TRANSITORY COMPUTER READABLE MEDIUM, AND PRINT INSTRUCTION METHOD FOR INCREASING QUALITY OF A PHOTOGRAPHIC IMAGE AND READ ACCURACY OF A CODE IMAGE

(71) Applicant: FUJI XEROX CO., LTD., Tokyo (JP)

(72) Inventors: Hiroo Yoshida, Kanagawa (JP); Naoki Yasuda, Kanagawa (JP); Shingo Kato, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/804,884

(22) Filed: Jul. 21, 2015

(65) Prior Publication Data

US 2016/0210089 A1    Jul. 21, 2016

(30) Foreign Application Priority Data

Jan. 16, 2015   (JP) .................................. 2015-006948

(51) Int. Cl.
| | |
|---|---|
| *H04N 1/405* | (2006.01) |
| *G06F 3/12* | (2006.01) |
| *G06K 15/02* | (2006.01) |
| *H04N 1/40* | (2006.01) |
| *H04N 1/32* | (2006.01) |
| *H04N 1/00* | (2006.01) |

(52) U.S. Cl.
CPC .......... *G06F 3/1208* (2013.01); *G06F 3/1247* (2013.01); *G06F 3/1253* (2013.01); *G06F 3/1285* (2013.01); *G06K 15/1807* (2013.01); *G06K 15/1822* (2013.01); *G06K 15/1881* (2013.01); *G06K 15/1882* (2013.01); *H04N 1/0035* (2013.01); *H04N 1/32128* (2013.01); *H04N 1/405* (2013.01); *H04N 1/40062* (2013.01)

(58) Field of Classification Search
None
See application file for complete search history.

(56) References Cited

U.S. PATENT DOCUMENTS

| | | | | |
|---|---|---|---|---|
| 5,072,291 | A * | 12/1991 | Sekizawa ........... | H04N 1/40062 358/3.21 |
| 6,466,329 | B1 * | 10/2002 | Mukai ................ | H04N 1/00355 358/1.13 |
| 6,950,207 | B1 * | 9/2005 | Saitoh .................. | G06F 3/1205 358/1.9 |
| 8,215,555 | B2 | 7/2012 | Hotokeishi | |

(Continued)

FOREIGN PATENT DOCUMENTS

| | | |
|---|---|---|
| JP | 2010-225038 A | 10/2010 |
| JP | 2014-2697 A | 1/2014 |
| JP | 2014-78188 A | 5/2014 |

*Primary Examiner* — Scott A Rogers
(74) *Attorney, Agent, or Firm* — Sughrue Mion, PLLC

(57) ABSTRACT

A print instruction device includes an obtaining unit, a detection unit, and a processing unit. The obtaining unit obtains image data including a photographic image and a code image. The detection unit detects the code image from the image data obtained by the obtaining unit. The processing unit performs, for the image data obtained by the obtaining unit, a halftoning process on the photographic image and performs no halftoning process on the code image.

7 Claims, 8 Drawing Sheets

(56) References Cited

U.S. PATENT DOCUMENTS

| | | | | |
|---|---|---|---|---|
| 8,228,561 B2* | 7/2012 | Stevens | .................. | G06K 15/02 358/1.9 |
| 8,614,833 B2* | 12/2013 | Oda | ...................... | G06F 3/1204 358/1.9 |

* cited by examiner

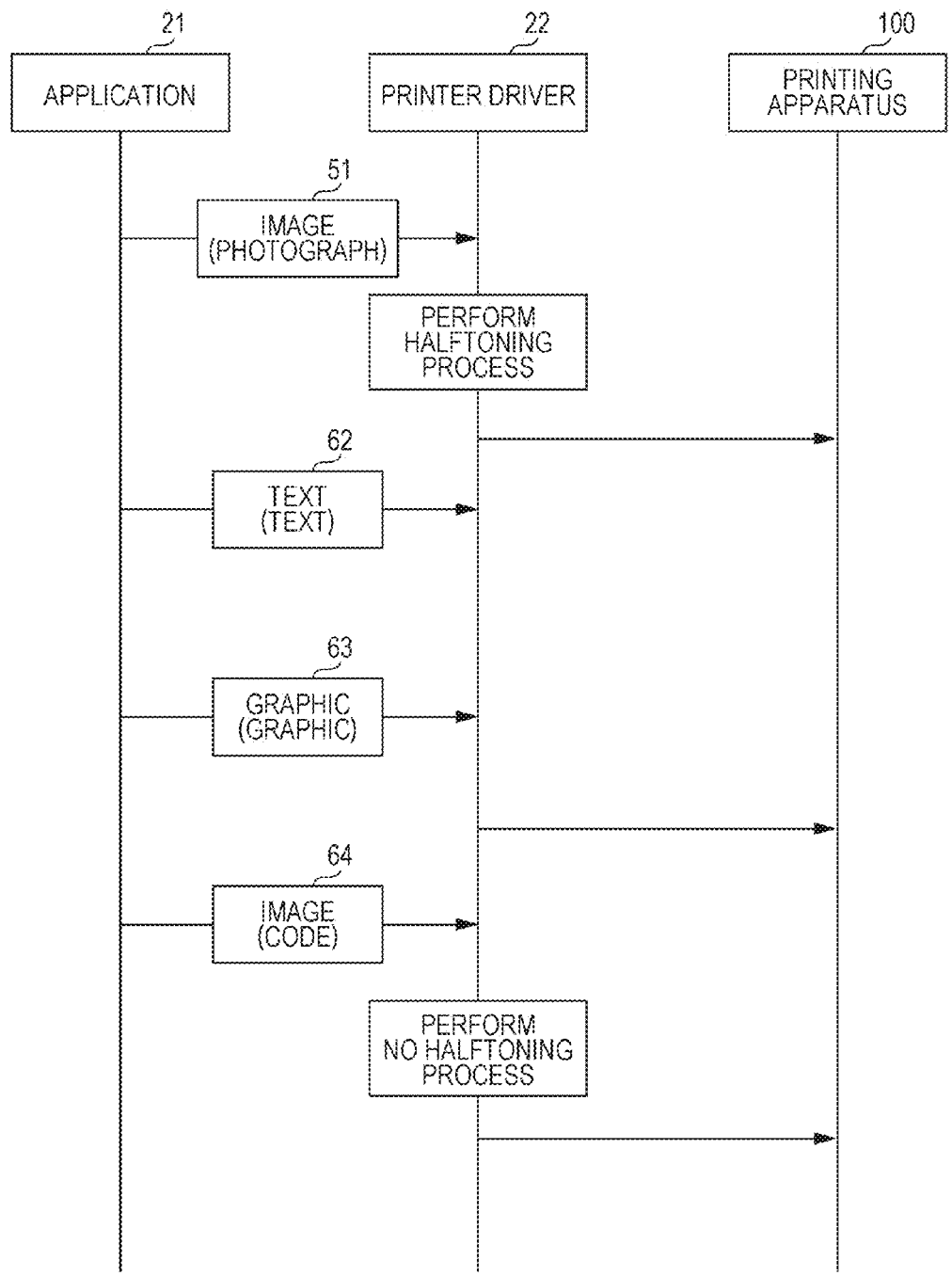

FIG. 8A
FIG. 8B
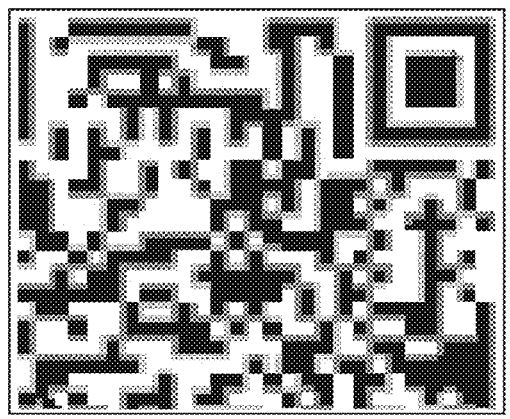
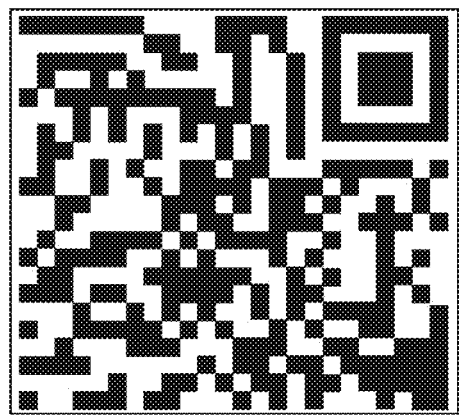

PRINT INSTRUCTION DEVICE, PRINTING SYSTEM, NON-TRANSITORY COMPUTER READABLE MEDIUM, AND PRINT INSTRUCTION METHOD FOR INCREASING QUALITY OF A PHOTOGRAPHIC IMAGE AND READ ACCURACY OF A CODE IMAGE

CROSS-REFERENCE TO RELATED APPLICATIONS

This application is based on and claims priority under 35 USC 119 from Japanese Patent Application No. 2015-006948 filed Jan. 16, 2015.

BACKGROUND

Technical Field

The present invention relates to a print instruction device, a printing system, a non-transitory computer readable medium, and a print instruction method.

SUMMARY

According to an aspect of the invention, there is provided a print instruction device including an obtaining unit, a detection unit, and a processing unit. The obtaining unit obtains image data including a photographic image and a code image. The detection unit detects the code image from the image data obtained by the obtaining unit. The processing unit performs, for the image data obtained by the obtaining unit, a halftoning process on the photographic image and performs no halftoning process on the code image.

BRIEF DESCRIPTION OF THE DRAWINGS

An exemplary embodiment of the present invention will be described in detail based on the following figures, wherein:

FIG. 5 is a sequence chart for describing the creation process for creating print data;

FIGS. 8A and 8B are diagrams for describing a relation between a code image and a halftoning process.

DETAILED DESCRIPTION

Hereinafter, an exemplary embodiment of the present invention will be described in detail with reference to the attached drawings.

Figure 1:
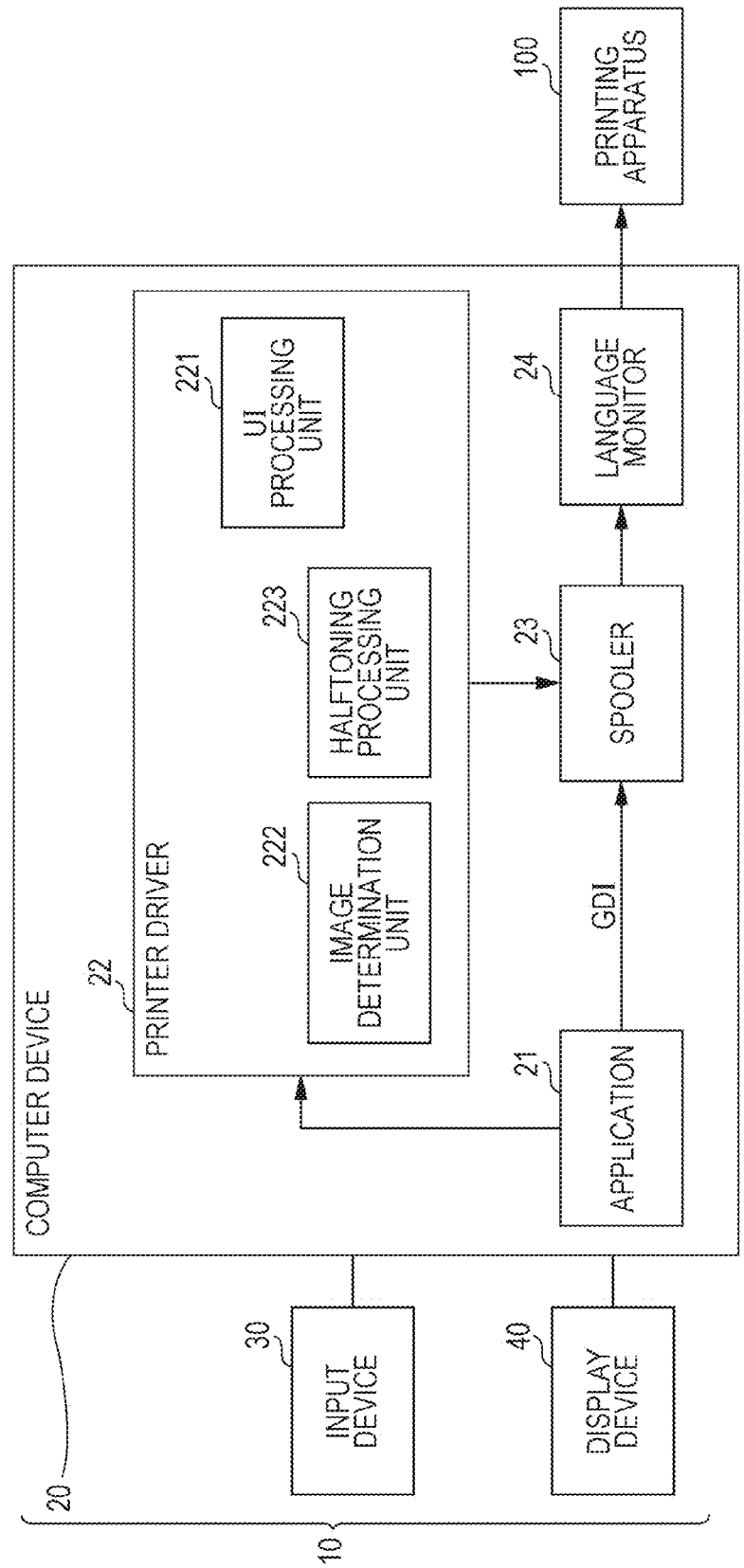
FIG. 1 is a block diagram illustrating an example of a configuration of a printing system.

FIG. 1 is a block diagram illustrating an example of a configuration of a printing system to which this exemplary embodiment is applied.

This printing system includes a host apparatus 10 and a printing apparatus 100 that is connected to the host apparatus 10 over a network or the like. Here, the host apparatus 10 creates print data in accordance with an instruction accepted from a user. The printing apparatus 100 prints an image on a recording medium, such as a sheet, on the basis of the print data transmitted from the host apparatus 10.

The host apparatus 10 includes a computer device 20, and an input device 30 and a display device 40 that are connected to the computer device 20. The computer device 20 performs various processes for creating print data. The input device 30 accepts various instructions input by a user and transmits the instructions to the computer device 20. The display device 40 displays an image that is transmitted from the computer device 20 and that is to be shown to the user.

The computer device 20, which is an example of a print instruction device, includes an application 21, a printer driver 22, a spooler 23, and a language monitor 24. The application 21 is software for creating a document, for example. The printer driver 22 generates print data that is interpretable by the printing apparatus 100, on the basis of the document created by the application 21. Here, the printer driver 22 identifies objects that constitute the document transmitted from the application 21 and generates Page Description Language (PDL) data as print data to be transmitted to the printing apparatus 100. Note that examples of the objects include a graphic object including a graphic, a text object including a text image, and an image object including a photographic image or a code image. The spooler 23 temporarily stores the print data to be output to the printing apparatus 100 via a graphics device interface (GDI), in response to a print request from the printer driver 22. The language monitor 24 transmits/receives data and the like to/from the printing apparatus 100.

The printer driver 22 includes a user interface (UI) processing unit 221, an image determination unit 222, and a halftoning processing unit 223.

The UI processing unit 221 sets a "code image optimization mode". The code image optimization mode is a mode that is set in order to increase the read accuracy of a code image included in a document created by the application 21. Note that a code image is an image that includes code information, and examples thereof include a one-dimensional code, such as a barcode, and a two-dimensional code, such as a QR code. The code image optimization mode is set in accordance with a user instruction accepted via the input device 30. The image determination unit 222 determines whether various objects that constitute the document transmitted from the application 21 are image objects. The halftoning processing unit 223 performs a halftoning process on data that is input. The halftoning process performed by the halftoning processing unit 223 may be a process that uses any existing method among various processing methods, such as a density pattern method, a dither method, and an error diffusion method.

In this exemplary embodiment, the UI processing unit 221 functions as an obtaining unit and a setting unit, for example. The image determination unit 222 functions as a detection unit, and the halftoning processing unit 223 functions as a processing unit, for example. The spooler 23 and the language monitor 24 function as an output unit, for example.

The printing apparatus 100 may be an apparatus that forms images using toner or may be an apparatus that forms images using ink. The printing apparatus 100 may be an apparatus that forms monochrome images or may be an apparatus that forms color images.

Figure 2:
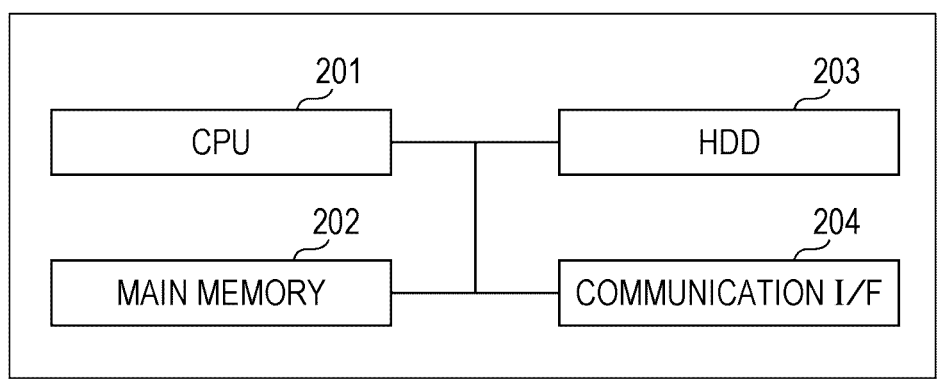
FIG. 2 is a block diagram illustrating an example of a hardware configuration of a computer device.

FIG. 2 is a block diagram illustrating an example of a hardware configuration of the computer device 20.

The computer device 20 is implemented as a personal computer, for example. The computer device 20 includes a central processing unit (CPU) 201, which is an arithmetic unit, and a main memory 202 and a hard disk drive (HDD) 203, which are memories. Here, the CPU 201 executes various programs, such as an operating system (OS) and the application 21. The main memory 202 is a storage area for storing the programs, data used in executing the programs, and the like. The HDD 203 is a storage area for storing data input into the programs, data output from the programs, and the like. The computer device 20 further includes a communication interface (hereinafter referred to as "communication I/F") 204 for communication with the input device 30, the display device 40, and the printing apparatus 100.

Note that the functions of the application 21, the printer driver 22, the spooler 23, and the language monitor 24 that constitute the computer device 20 illustrated in FIG. 1 are implemented by software and hardware resources working together. Specifically, the CPU 201 included in the computer device 20 loads a program for implementing the functions of the above-described components from the storage area of the HDD 203 to the main memory 202, for example, and implements the functions. Note that the program may be provided to the computer device 20 over a network not illustrated, for example. Alternatively, the program may be provided in a different way. For example, the program may be stored in a recording medium, such as a compact disc read-only memory (CD-ROM), and be provided from the recording medium.

Figure 3:
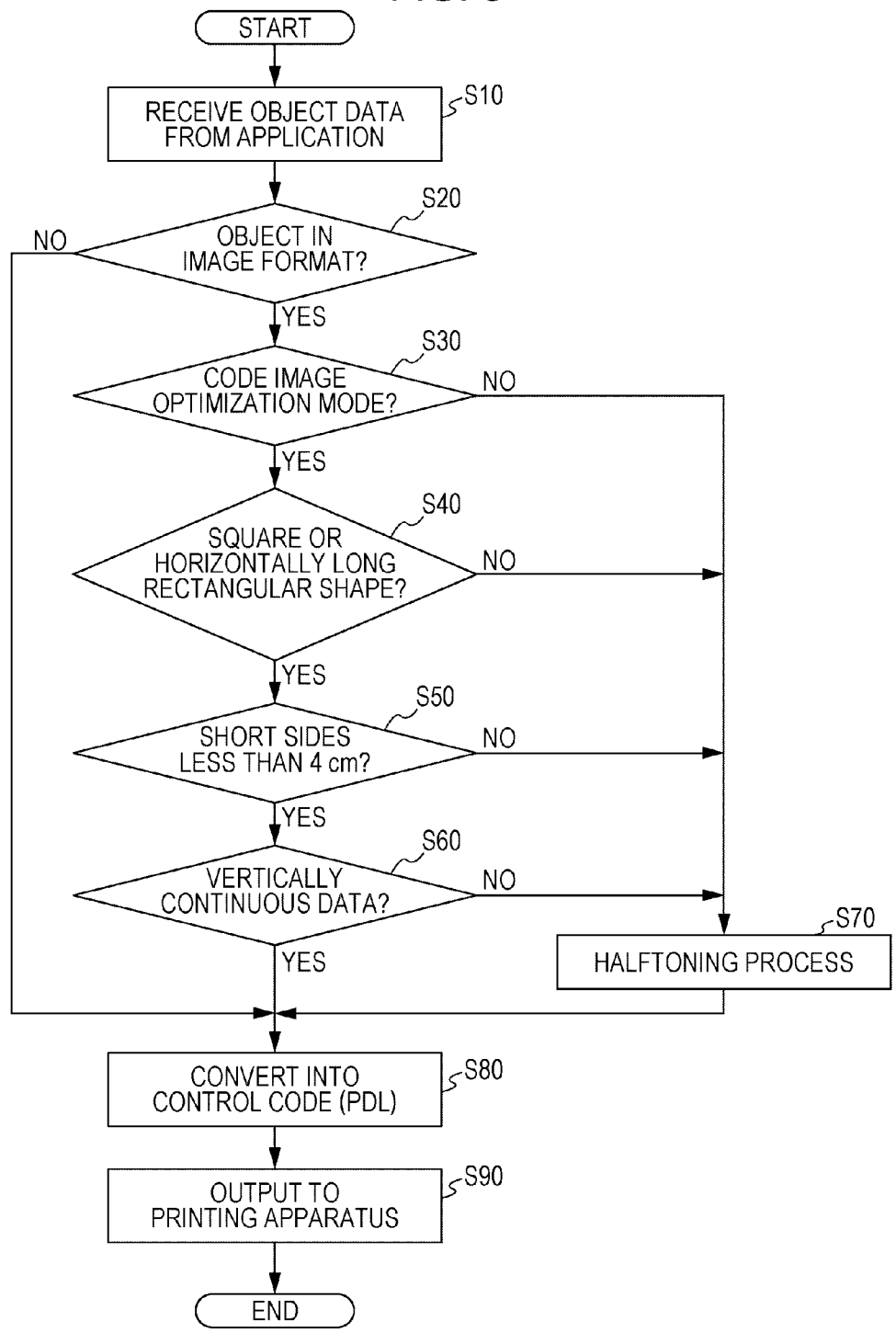
FIG. 3 is a flowchart illustrating a creation process for creating print data.

FIG. 3 is a flowchart illustrating a creation process for creating print data performed by the computer device 20.

First, a user creates a document using the application 21 and provides a print instruction for printing the document. In response to the print instruction, the printer driver 22 receives object data that corresponds to the document from the application 21 (step S10). Here, the object data is an example of image data.

Then, the image determination unit 222 analyzes the received object data and determines whether the object is in an image format (whether the object is an image object) (step S20). If the result of determination in step S20 is negative (No), the flow proceeds to step S80 described below.

On the other hand, if the result of determination in step S20 is positive (Yes), the UI processing unit 221 determines whether the code image optimization mode is set by the user (step S30). If the result of determination in step S30 is negative (No), the halftoning processing unit 223 performs a halftoning process on the object (step S70), and the flow proceeds to step S80.

If the result of determination in step S30 is positive (Yes), the image determination unit 222 analyzes an image that constitutes the object, and determines whether the image has a square or horizontally long rectangular shape (step S40). If the result of determination in step S40 is negative (No), the halftoning processing unit 223 performs a halftoning process on the object (step S70), and the flow proceeds to step S80.

On the other hand, if the result of determination in step S40 is positive (Yes), the image determination unit 222 determines whether the short sides of the image that is determined to have a square or horizontally long rectangular shape are less than 4 cm in length (step S50). If the result of determination in step S50 is negative (No), the halftoning processing unit 223 performs a halftoning process on the object (step S70), and the flow proceeds to step S80.

If the result of determination in step S50 is positive (Yes), the image determination unit 222 determines whether data of the image that is determined to have a square or horizontally long rectangular shape and to have short sides of less than 4 cm has vertical continuity (step S60). If the result of determination in step S60 is negative (No), the halftoning processing unit 223 performs a halftoning process on the object (step S70), and the flow proceeds to step S80.

On the other hand, if the result of determination in step S60 is positive (Yes), the halftoning processing unit 223 does not perform a halftoning process on the object, and the flow proceeds to step S80.

Note that the process from step S40 to step S60 is a process for determining whether the image that constitutes the object is a code image. Here, determination in step S40 is performed in accordance with a condition that is determined on the basis of the fact that barcodes, QR codes, and the like usually have a rectangular shape. Determination in step S50 is performed in accordance with a condition that is determined on the basis of the fact that the short sides of barcodes, QR codes, and the like are usually less than 4 cm in length. Further, determination in step S60 is performed on the basis of the fact that barcodes, QR codes, and the like usually have vertical continuity. Note that determination of vertical continuity performed in step S60 will be described below.

The printer driver 22 converts the data on which a halftoning process has been performed and/or the data on which a halftoning process has not been performed into a control code (PDL) that is interpretable by the printing apparatus 100 (step S80). Thereafter, the obtained control code (PDL) is output to the printing apparatus 100 via the spooler 23 and the language monitor 24 (step S90).

The printing apparatus 100 that receives the control code (PDL) interprets the control code (PDL), and prints the image on a recording medium.

Now, the above-described creation process for creating print data is further described in detail with reference to a specific example.

Figure 4:
FIG. 4 is a diagram illustrating an example of a document (object data) to be printed.

FIG. 4 is a diagram illustrating an example of a document (object data) 60 to be printed. Here, a case of printing an image on an A4 portrait sheet is assumed.

The document 60 illustrated in FIG. 4 includes a photographic image 61, a text image 62, a graphic 63, and a code image 64. The photographic image 61 is an image object constituted by a multi-value gradation image (256 gradations, for example). The text image 62 is a text object, and the graphic 63 is a graphic object. The code image 64 is an image object constituted by a binary gradation image. It is assumed in this example that the code image 64 is constituted by a QR code.

FIG. 5 is a sequence chart for describing the creation process for creating print data on the basis of the document 60 illustrated in FIG. 4. Here, a case is assumed where the code image optimization mode is set by a user, for example.

In this case, the photographic image 61 (image object) included in the document 60 is transmitted from the application 21 to the printer driver 22 first. Then, the printer driver 22 performs a halftoning process on the photographic image 61 that is determined to be an image object but not to be a QR code, and outputs the result towards the printing apparatus 100.

In this example, the text image 62 (text object) included in the document 60 is transmitted from the application 21 to the printer driver 22 next. Then, the printer driver 22 outputs the text image 62 that is determined not to be an image object towards the printing apparatus 100 without performing a halftoning process.

In this example, the graphic 63 (graphic object) included in the document 60 is subsequently transmitted from the application 21 to the printer driver 22. Then, the printer driver 22 outputs the graphic 63 that is determined not to be an image object towards the printing apparatus 100 without performing a halftoning process.

In this example, the code image 64 (image object) included in the document 60 is transmitted from the application 21 to the printer driver 22 last. Then, the printer driver 22 outputs the code image 64 that is determined to be an image object and to be a QR code towards the printing apparatus 100 without performing a halftoning process.

Figure 6A:
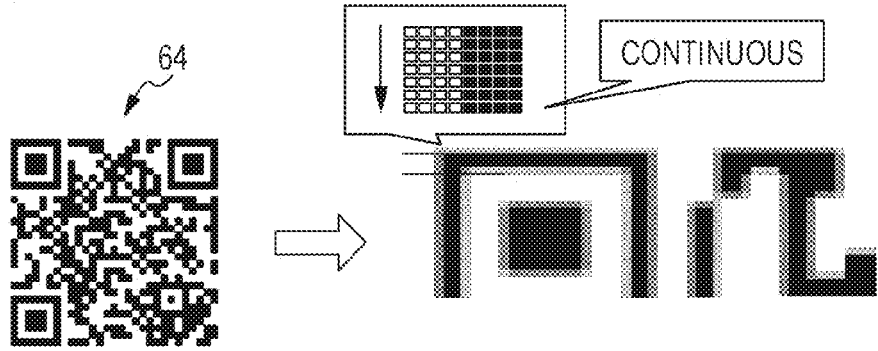
FIGS. 6A to 6C are diagrams for describing determination performed in step S60 in FIG. 3.
Figure 6B:
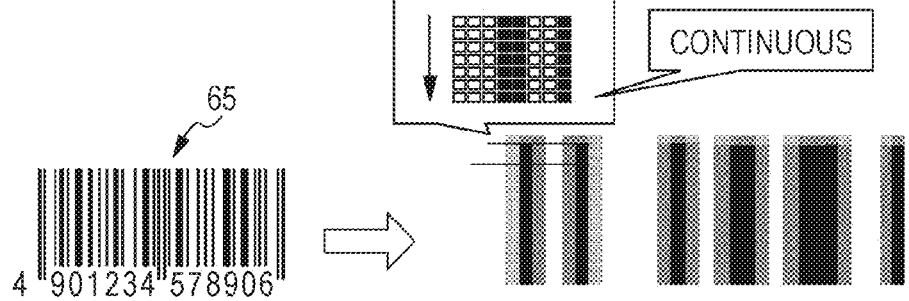
Figure 6C:
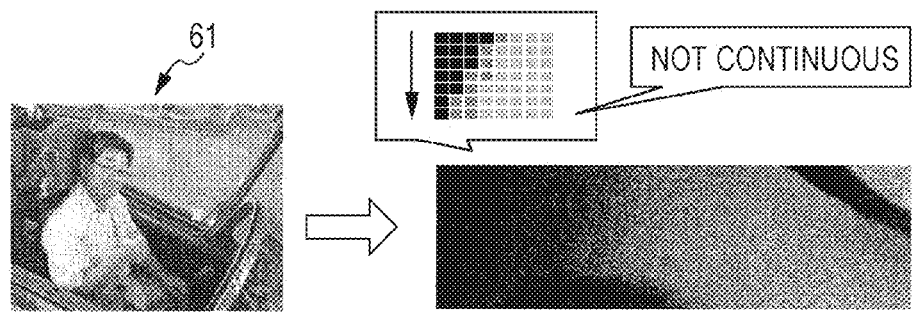

FIGS. 6A to 6C are diagrams for describing determination performed in step S60 in FIG. 3. Here, FIG. 6A illustrates the code image 64 constituted by a QR code, FIG. 6B illustrates another code image 65 constituted by a barcode, and FIG. 6C illustrates the photographic image 61. In each of FIGS. 6A to 6C, the general view of each image is illustrated on the left, and a detailed view of each image is illustrated on the right.

Here, in the code image 64 (QR code) illustrated in FIG. 6A or in the other code image 65 (barcode) illustrated in FIG. 6B, a black-filled portion vertically extends in the same gradation. On the other hand, in the photographic image 61 illustrated in FIG. 6C, a black-filled portion vertically extends in different gradations. Accordingly, for an image like those illustrated in FIGS. 6A and 6B, the result of determination in step S60 in FIG. 3 is positive (Yes). On the other hand, for an image like that illustrated in FIG. 6C, the result of determination in step S60 in FIG. 3 is negative (No).

Figure 7A:
FIGS. 7A and 7B are diagrams for describing a relation between a photographic image and a halftoning process.
Figure 7B:

FIGS. 7A and 7B are diagrams for describing a relation between the photographic image 61 and a halftoning process. Here, FIG. 7A illustrates the photographic image 61 on which a halftoning process has been performed, and FIG. 7B illustrates the photographic image 61 on which a halftoning process has not been performed.

FIGS. 8A and 8B are diagrams for describing a relation between the code image 64 and a halftoning process. Here, FIG. 8A illustrates the code image 64 on which a halftoning process has been performed, and FIG. 8B illustrates the code image 64 on which a halftoning process has not been performed. Note that, in FIGS. 8A and 8B, a portion of the code image 64 is enlarged.

Here, a case is assumed where a halftoning process is performed on both the photographic image 61 and the code image 64 that constitute image objects in the document 60. In this case, the photographic image 61 that is printed is as illustrated in FIG. 7A, and the code image 64 that is printed is as illustrated in FIG. 8A. The quality of the photographic image 61 is good. On the other hand, the code image 64 becomes blurred, resulting in a reduced read accuracy.

Next, a case is assumed where a halftoning process is not performed on either of the photographic image 61 and the code image 64 that constitute image objects in the document 60. In this case, the photographic image 61 that is printed is as illustrated in FIG. 7B, and the code image 64 that is printed is as illustrated in FIG. 8B. The read accuracy of the code image 64 is good. On the other hand, the photographic image 61 is represented as a binary image, resulting in reduced quality.

In this exemplary embodiment, however, in the case where the code image optimization mode is set, regarding the photographic image 61 and the code image 64 that constitute image objects in the document 60, a halftoning process is performed on the photographic image 61 while a halftoning process is not performed on the code image 64. In this case, the photographic image 61 that is printed is as illustrated in FIG. 7A, and the code image 64 that is printed is as illustrated in FIG. 8B. By setting the code image optimization mode as described above, the quality of the photographic image 61 is good, and the read accuracy of the code image 64 is also good.

In this exemplary embodiment, the code image 64 is identified from among image objects while assuming that the code image optimization mode is set by a user. However, identification of the code image 64 may be performed in another way. Specifically, the code image 64 may be identified from among image objects regardless of whether the code image optimization mode is set.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A print instruction device comprising:
   at least one processor configured to execute:
      an obtaining unit that obtains image data including a photographic image and a code image;
      a detection unit that detects the photographic image and the code image from the image data obtained by the obtaining unit; and
      a processing unit that performs, for the image data obtained by the obtaining unit, a halftoning process on the detected photographic image and performs no halftoning processes on the detected code image, to thereby generate processed data,
   wherein the detection unit detects, in a case where the image data includes another code image different from the code image, the code image and the another code image from the image data, and
   wherein the processing unit performs a halftoning process on the detected photographic image and performs no halftoning processes on the detected code image and on the detected another code image.

2. The print instruction device according to claim 1, wherein
   the obtaining unit obtains the image data in which both the photographic image and the code image are set as image objects, and
   the detection unit detects the code image from data in the image data, the data being set as the image objects.

3. The print instruction device according to claim 1, wherein the at least one processor is further configured to execute:
   a setting unit that performs setting so as not to make the detection unit detect the code image, in accordance with an instruction provided by a user.

4. The print instruction device according to claim 2, wherein the at least one processor is further configured to execute:

a setting unit that performs setting so as not to make the detection unit detect the code image, in accordance with an instruction provided by a user.

5. A printing system comprising:
a print instruction device including:
  at least one processor configured to execute:
    an obtaining unit that obtains image data including a photographic image and a code image;
    a detection unit that detects the photographic image and the code image from the image data obtained by the obtaining unit;
    a processing unit that performs, for the image data obtained by the obtaining unit, a halftoning process on the detected photographic image and performs no halftoning processes on the detected code image; and
    an output unit that outputs print data including the photographic image on which a halftoning process has been performed and the code image on which no halftoning processes have been performed; and
a printing apparatus configured to print an image on a recording medium by using the print data received from the print instruction device,
wherein the detection unit detects, in a case where the image data includes another code image different from the code image, the code image and the another code image from the image data, and
wherein the processing unit performs a halftoning process on the detected photographic image and performs no halftoning processes on the detected code image and on the detected another code image.

6. A non-transitory computer readable medium storing a program causing a computer to execute a process comprising:

obtaining image data including a photographic image and a code image;
detecting the photographic image and the code image from the image data that has been obtained; and
performing, for the image data that has been obtained, a halftoning process on the detected photographic image and performing no halftoning processes on the detected code image,
wherein the detecting comprises detecting, in a case where the image data includes another code image different from the code image, the code image and the another code image from the image data, and
wherein the performing comprises performing a halftoning process on the detected photographic image and performing no halftoning processes on the detected code image and on the detected another code image.

7. A print instruction method comprising:
obtaining image data including a photographic image and a code image;
detecting the photographic image and the code image from the image data that has been obtained; and
performing, for the image data that has been obtained, a halftoning process on the detected photographic image and performing no halftoning processes on the detected code image,
wherein the detecting comprises detecting, in a case where the image data includes another code image different from the code image, the code image and the another code image from the image data, and
wherein the performing comprises performing a halftoning process on the detected photographic image and performing no halftoning processes on the detected code image and on the detected another code image.

* * * * *